United States Patent
Ihrke et al.

(10) Patent No.: US 9,149,933 B2
(45) Date of Patent: Oct. 6, 2015

(54) GRASP ASSIST DEVICE WITH SHARED TENDON ACTUATOR ASSEMBLY

(71) Applicants: GM GLOBAL TECHNOLOGY OPERATIONS LLC, Detroit, MI (US); The United States of America as Represented by the Administrator of the National Aeronautics and Space Administration, Washington, DC (US)

(72) Inventors: Chris A. Ihrke, Hartland, MI (US); Bryan J. Bergelin, Houston, TX (US); Lyndon Bridgwater, Houston, TX (US)

(73) Assignees: GM Global Technology Operations LLC, Detroit, MI (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/175,094

(22) Filed: Feb. 7, 2014

(65) Prior Publication Data

US 2014/0222199 A1    Aug. 7, 2014

Related U.S. Application Data

(60) Provisional application No. 61/762,025, filed on Feb. 7, 2013.

(51) Int. Cl.
*G05B 19/18* (2006.01)
*B25J 15/00* (2006.01)
*B25J 9/10* (2006.01)

(52) U.S. Cl.
CPC .............. *B25J 15/0009* (2013.01); *B25J 9/104* (2013.01)

(58) Field of Classification Search
CPC ...... B25J 9/0006; B25J 15/0009; B25J 13/02; B25J 3/00
USPC .......... 700/213, 250, 253, 258, 260; 901/1, 4, 901/8, 9, 30, 33; 2/159, 160
See application file for complete search history.

(56) References Cited

U.S. PATENT DOCUMENTS

| | | | | |
|---|---|---|---|---|
| 5,117,700 | A * | 6/1992 | Trechsel | 74/89.24 |
| 5,845,540 | A * | 12/1998 | Rosheim | 74/490.05 |
| 5,967,580 | A * | 10/1999 | Rosheim | 294/198 |
| 6,658,962 | B1 * | 12/2003 | Rosheim | 74/490.05 |
| 7,784,363 | B2 * | 8/2010 | Ihrke et al. | 73/862.041 |
| 8,029,414 | B2 * | 10/2011 | Ingvast et al. | 482/47 |
| 8,056,423 | B2 * | 11/2011 | Abdallah et al. | 73/826 |

(Continued)

*Primary Examiner* — Khoi Tran
*Assistant Examiner* — Jorge Peche
(74) *Attorney, Agent, or Firm* — Quinn Law Group, PLLC

(57) ABSTRACT

A grasp assist device includes a glove with first and second tendon-driven fingers, a tendon, and a sleeve with a shared tendon actuator assembly. Tendon ends are connected to the respective first and second fingers. The actuator assembly includes a drive assembly having a drive axis and a tendon hook. The tendon hook, which defines an arcuate surface slot, is linearly translatable along the drive axis via the drive assembly, e.g., a servo motor thereof. The flexible tendon is routed through the surface slot such that the surface slot divides the flexible tendon into two portions each terminating in a respective one of the first and second ends. The drive assembly may include a ball screw and nut. An end cap of the actuator assembly may define two channels through which the respective tendon portions pass. The servo motor may be positioned off-axis with respect to the drive axis.

18 Claims, 3 Drawing Sheets

(56) References Cited

U.S. PATENT DOCUMENTS

| | | | |
|---|---|---|---|
| 2003/0223844 A1* | 12/2003 | Schiele et al. | 414/5 |
| 2007/0236162 A1* | 10/2007 | Kawabuchi et al. | 318/568.16 |
| 2010/0011899 A1* | 1/2010 | Kim et al. | 74/490.04 |
| 2010/0147098 A1* | 6/2010 | Park et al. | 74/490.06 |
| 2010/0152898 A1* | 6/2010 | Reiland et al. | 700/261 |
| 2010/0207412 A1* | 8/2010 | Okazaki et al. | 294/106 |
| 2010/0259057 A1* | 10/2010 | Madhani | 294/106 |
| 2010/0280662 A1* | 11/2010 | Abdallah et al. | 700/261 |
| 2011/0071664 A1* | 3/2011 | Linn et al. | 700/213 |
| 2011/0071678 A1* | 3/2011 | Ihrke et al. | 700/258 |
| 2011/0130879 A1* | 6/2011 | Abdallah et al. | 700/260 |
| 2011/0241369 A1* | 10/2011 | Kamon et al. | 294/213 |
| 2012/0068486 A1* | 3/2012 | Kim et al. | 294/213 |
| 2012/0109379 A1* | 5/2012 | Abdallah et al. | 700/260 |
| 2013/0219586 A1 | 8/2013 | Ihrke et al. | |
| 2013/0226360 A1 | 8/2013 | Bergelin et al. | |
| 2014/0217762 A1* | 8/2014 | Ihrke et al. | 294/198 |

* cited by examiner

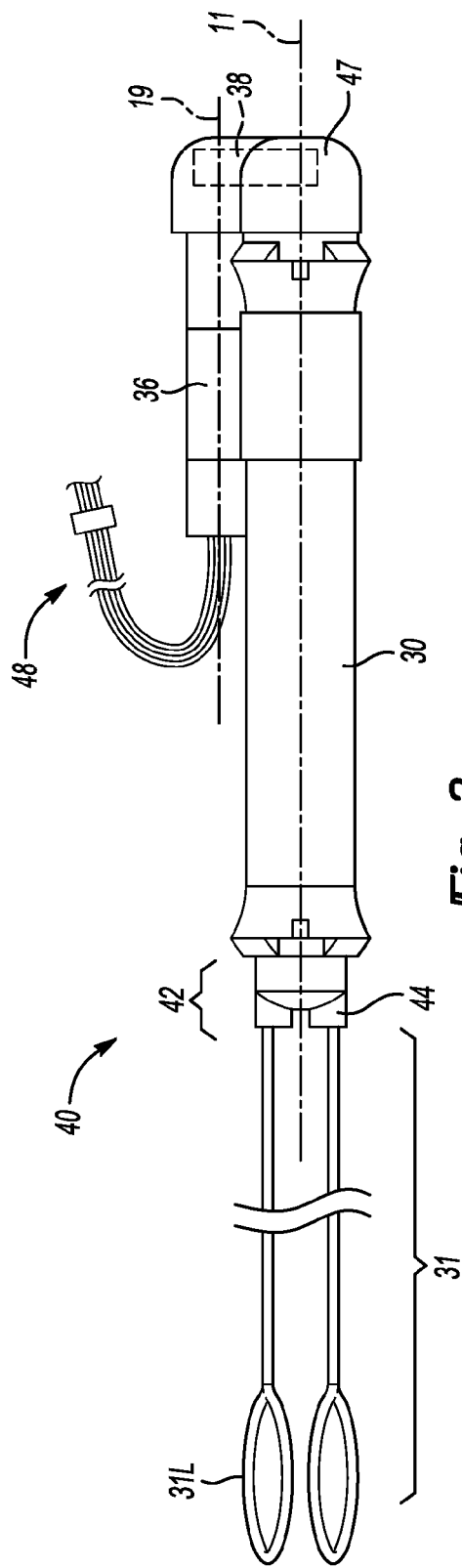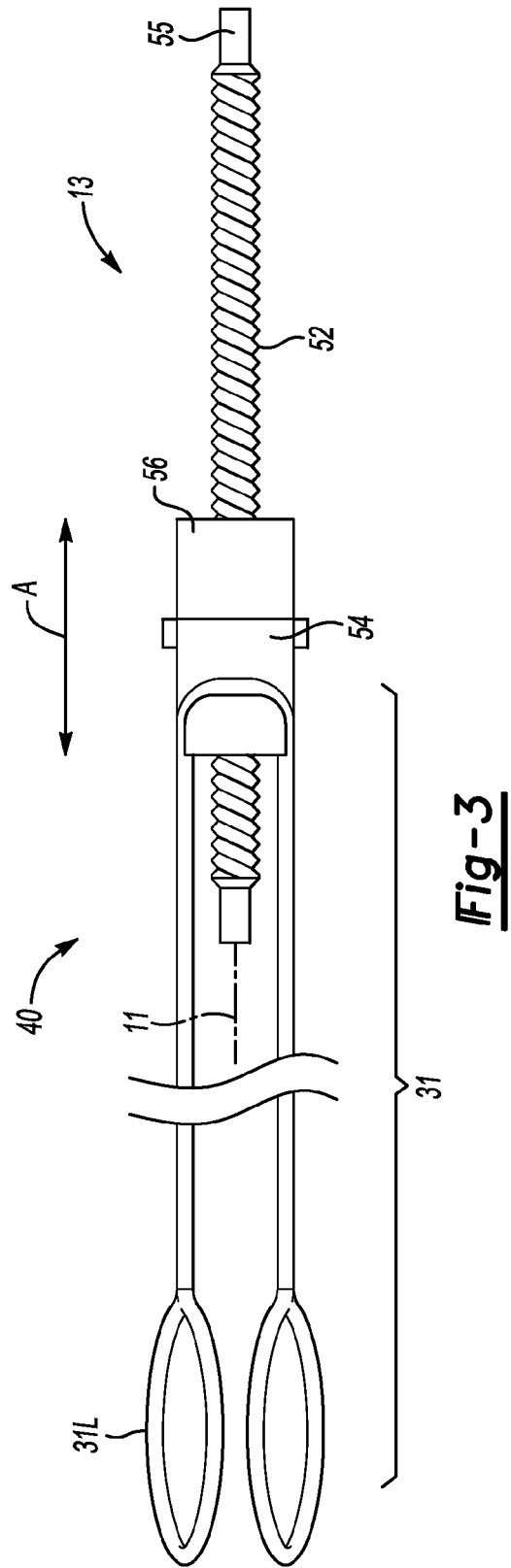

GRASP ASSIST DEVICE WITH SHARED TENDON ACTUATOR ASSEMBLY

CROSS-REFERENCE TO RELATED APPLICATION

This application claims the benefit of U.S. Provisional Patent Application No. 61/762,025, filed Feb. 7, 2013, and which is hereby incorporated by reference in its entirety.

STATEMENT REGARDING FEDERALLY SPONSORED RESEARCH OR DEVELOPMENT

This invention was made with government support under NASA Space Act Agreement number SAA-AT-07-003. The invention described herein may be manufactured and used by or for the U.S. Government for U.S. Government (i.e., non-commercial) purposes without the payment of royalties thereon or therefor.

TECHNICAL FIELD

The present disclosure relates to a grasp assist device having at least one shared tendon actuator assembly.

BACKGROUND

Manual operations, particularly those requiring repetitive or sustained grasping of a work tool or other object over an extended period of time, tend to cause fatigue. Fatigue may manifest itself in an operator's hands, fingers, and forearms. As a result, an operator's grasp strength and productivity may decline over the course of a work day. Relative grasp strength may also vary among different operators due to inherent differences in the physical stature, strength, injury, and/or relative levels of muscle fatigue of the operators.

The variable nature of an operator's grasp strength may result in inefficiencies in the execution of certain grasp-related work tasks. Prior art approaches that have recognized this problem tend to reinforce the operator's structural stability via wrist straps or back braces. To a certain extent, ergonomic improvements in the workplace have eased the levels of stress experienced during manual task execution, for instance by overhead lift assistance robots, improved materials placement, and the like. However, these and other prior art devices may remain less than optimal for improving the overall grasp strength of an operator.

SUMMARY

An improved grasp assist device is disclosed herein which addresses some of the limitations present in the prior art approaches noted above. The grasp assist device includes a glove and a sleeve, which may be worn on a respective hand and forearm of an operator. Linear actuators supported within the sleeve provide tension to flexible tendons, which in turn are connected to the fingers and/or thumb of a glove. The selective tensioning of the tendons improves the operator's grasp strength, and may also facilitate rehabilitation from an injury.

It is recognized herein that existing tendon-driven grasp assist devices have certain performance limitations. For example, some designs may require actuator over sizing in order to provide a sufficient amount of actuator travel for applying necessary amounts of tension to a given tendon, e.g., to fully close a finger of a hand wearing the glove into a desired grasp pose. Substantial increases in both size and weight may be required to provide the required amounts of travel. The present approach is intended to address this particular challenge, and therefore serves as an improvement to certain existing tendon-driven grasp assistance designs.

The sleeve of the presently disclosed grasp assist device contains at least one shared tendon actuator assembly and a length of flexible tendon, for instance a braided polymer material. The tendon is gently bent or folded about its approximate midpoint into two portions, such that two free ends are defined. The tendon is connected at its approximate midpoint to a drive assembly of the shared tendon actuator assembly, such that the tendon portions are selectively tensioned in a balanced manner via application by the shared actuator assembly of a calculated tensile force.

The ends of the tendon are connected to adjacent fingers of the glove. The shared actuator assembly pulls as needed on the portions of the tendon to fully close the adjacent fingers of the glove into a desired grasp pose. In an alternative embodiment, the same tendon may be similarly routed on the reverse of the glove to help open the operator's hand when releasing the grasp pose, i.e., grasp release assistance. Such a design may be beneficial in a rehabilitation scenario.

Load sensors may be positioned with respect to the glove, for instance on each of the fingers, a thumb, and a palm, to measure and provide force feedback signals to a controller. The controller may be one or more integrated circuit boards contained within part of the sleeve. The controller may be used to calculate and command the calculated tensile force from the actuator assembly, either with or without input from the operator.

In a particular embodiment, the shared actuator assembly includes a ball screw mechanism, a servo motor, and a gear set which connects the servo motor off-axis with respect to the ball screw mechanism. The ball-screw assembly includes a tendon hook which is connected to an internally-threaded ball nut, which in turn is engaged with an externally-threaded length of ball screw. The servo motor applies torque to the ball screw to linearly translate the tendon hook and ball nut with respect to the primary axis/length of the ball screw.

The tendon hook may define an arcuately-shaped slot that is sized to receive the tendon at its approximate middle. The walls of the slot form a sliding interface for the tendon, and thus the tendon hook may be constructed of a suitable low coefficient of friction material.

The ends of the tendon, each of which passes through a respective circular opening of a removable end cap, are attached to a corresponding one of the adjacent fingers. The shared actuator assembly thus applies approximately equal tension to both portions of the tendon regardless of differing loads encountered and/or travel required by each portion of the tendon. Use of the present design is intended to reduce the number of required linear actuators in the sleeve of the grasp assist device, thereby reducing weight, while also enabling grasp poses for a wider variety of objects, particularly those having an irregular or asymmetric shape.

A tendon actuator assembly is also disclosed for use with a first and a second tendon-actuated finger, e.g., of a grasp assist device or a robotic hand. The tendon actuator assembly may include a drive assembly having a drive axis, a flexible tendon having first and second looped ends each connectable to a respective one of the first and second tendon-actuated fingers, and a tendon hook. The tendon hook in this embodiment is connected to the drive assembly, is linearly translatable along the drive axis via the drive assembly, and defines an arcuate surface slot containing the flexible tendon. The arcuate surface slot divides the flexible tendon into two portions each terminating in a respective one of the first and second looped ends.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a schematic illustration of a shared tendon actuator assembly that may be used to actuate adjacent fingers of the grasp assist device shown in FIG. 1.

FIG. 3 is schematic illustration of a drive assembly and a flexible tendon of the shared tendon actuator assembly shown in FIG. 2.

DETAILED DESCRIPTION

Figure 1:
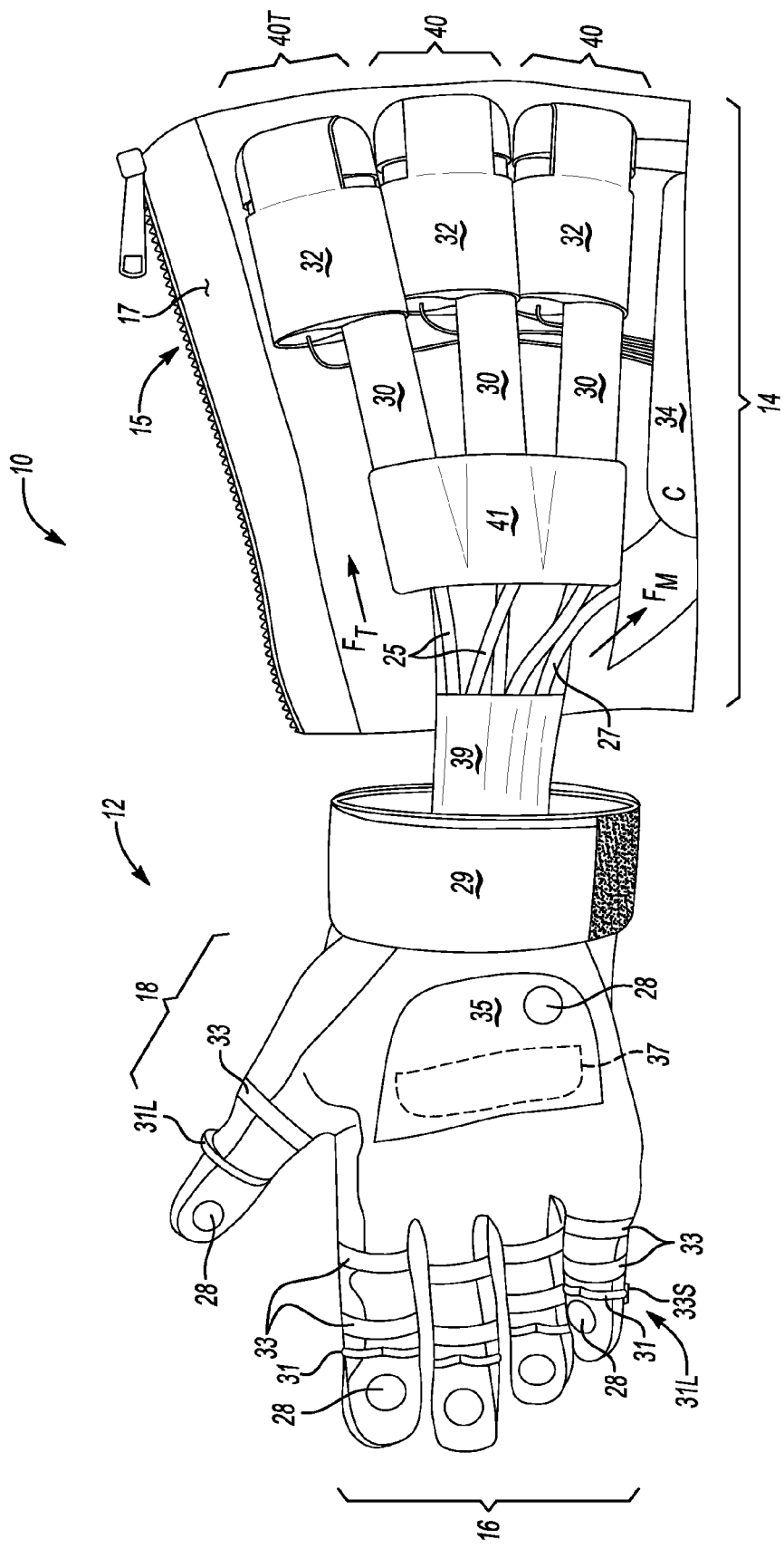
FIG. 1 is a schematic illustration of an example grasp assist device having a shared tendon actuator assembly.

Referring to the drawings, wherein like reference numbers refer to the same or similar components throughout the several views, an example grasp assist device 10 is shown schematically in FIG. 1. The grasp assist device 10 includes a glove 12 and a flexible sleeve 14, with the former to be worn on a hand of an operator and secured via a wrist strap 29, and with the latter to be worn on the operator's forearm. The sleeve 14 may be equipped with a fastening device 15, shown here as a zipper, such that material 17 of the sleeve 14 may be wrapped around the operator's forearm and zipped in place to cover the functional components of the sleeve 14 described below.

The grasp assist device 10 ultimately provides a tensile force (arrow $F_T$) to assist the operator in grasping an object. The grasp assist device 10 of FIG. 1 includes at least one shared tendon actuator assembly 40 as shown in FIG. 2, with the shared actuator assembly 40 including a drive assembly 13 as best shown in FIG. 3. A specially configured tendon hook 54 that is usable as part of the drive assembly 13 of FIG. 3 is described in detail below with reference to FIGS. 4-6. As will be appreciated by those having ordinary skill in the art, the drive assembly 13 may be used in other applications without connecting to the glove 12. For example, the glove 12 may be a robotic hand of an autonomous or semiautonomous humanoid robot without varying from the intended scope of the drive assembly 13.

With respect to the grasp assist device 10 of FIG. 1, the glove 12 is actuated via tensioning of flexible tendons 31 contained within protective conduits 25, with looped ends 31L of the tendons 31 visible from the perspective of FIG. 1. The tensile force (arrow $F_T$) required for a given grasp pose is calculated by a controller (C) 34, a portion of which is shown supported within the sleeve 14, in response to measured force feedback signals (arrow $F_M$) from one or more load sensors 28. The controller 34 may be embodied as one or more integrated circuit boards contained within part of the sleeve, with any required hardware and software elements such as a processor, tangible, non-transitory memory such as ROM, optical media, flash memory, etc., transitory memory such as RAM, input/output (I/O) devices, a transceiver, and the like. The controller 34 may be used to calculate and command the calculated tensile force from the actuator assembly, either with or without input from the operator.

The load sensors 28 may be positioned with respect to different surfaces of the glove 12, for instance at the ends of selected/each finger 16 and/or a thumb 18, and/or on a palm 35 of the glove 12, and electrically connected to the controller 34 via sensor wires 27, or placed in wireless communication with the controller 34 in other embodiments. The calculated tensile force (arrow $F_T$) is then applied to the tendons 31, with at least one pair of adjacent fingers 16 actuated via a shared tendon actuator assembly 40.

As used herein, "adjacent" means any immediately adjacent fingers 16, i.e., an index and middle finger or a ring finger and a pinky finger. Such adjacent pairs typically cooperate closely in grasping an object, particularly when that object is irregularly shaped as opposed to, for instance, a box, sphere, or cylinder. The requirement that there be at least one pair of adjacent fingers 16 is related to the use of the shared actuator assembly 40 as described below with reference to FIGS. 2-6. If a thumb 18 is actuated as part of the glove 12, the thumb 18 may use its own actuator assembly 40T, while still using certain off-axis space saving features enjoyed by the fingers 16 as described below.

The fingers 16 and thumb 18 shown in FIG. 1 may include one or more phalange rings 33, which may be both flexible and adjustable. Alternatively, some or all of the phalange rings 33, such as those disposed at the distal ends of the fingers 16 or thumb 18, may be non-adjustable saddle 33S, for instance a semi-circular hard plastic or aluminum piece defining a surface groove (not shown) within which the tendon 31 may be seated. When the glove 12 is worn on an operator's hand, each of the phalange rings 33 and saddles 33S may at least partially circumscribe a respective one of the fingers 16 and thumb 18, and thus the operator's own thumb and fingers, or positioned within material defining the glove 12. Thus, any tensile force (arrow $F_T$) applied to some or all of the tendons 31 and routed through the phalange rings 33 or saddles 33S acts indirectly on an operator's fingers/thumb through a reaction force.

In general, a grasping force exerted by an operator on any object held in the operator's grasp may be measured by any of the load sensor(s) 28 coming into contact with the object. Each phalange ring 33 or saddle 33S is connected to or in contact with any tendon 31 routed therethrough, with at least some of the phalange rings 33 or saddles 33S thus acting as guides for the tendons 31. The phalange rings 33 may be positioned at the distal, medial, or proximal joints of the finger 16 or thumb 18. Each of the tendons 31 terminates at or near a phalange ring 33 or saddle 33S, such as the distal end of the fingers 16. Where the tendons 31 terminate, a saddle 33S may be used to secure the tendon 31.

With respect to the sleeve 14 shown in FIG. 1, the tendons 31 are freely moveable within the conduit 25. The conduit 25 may be substantially rigid in the compressive direction and flexible in other directions, e.g., a stainless steel coil. The tendons 31 may be configured as a braided polymer, which in turn may include a suitable fluorocarbon that increases the wear life of each tendon. However, other materials such as nylon may also be used without departing from the intended scope of the invention. A plate 37, e.g., of hard plastic, may be positioned within the material of the glove 12 at the base of the fingers 16 in a suitable position such that closure of the fingers 16 is not obstructed. Although not shown in FIG. 1 for illustrative clarity, the ends of the conduit 25 may terminate beneath or within this plate 37, with the plate 37 securing the conduit 25 to the glove 12 and preventing undesired torsion or other motion of the conduit 25.

Still referring to FIG. 1, the shared tendon actuator assembly 40 and the thumb actuator assembly 40T may be secured within the sleeve 14 via straps 32. Each shared tendon actuator assembly 40 and the thumb actuator assembly 40T include an actuator housing 30, each of which may be secured via an additional strap 41. The straps 32 and 41 are intended to align the actuator assemblies 40 and 40T comfortably within the sleeve 14. Yet another strap 39 may be used to connect the glove 12 to the sleeve 14, as well as to secure the conduits 25 and sensor wires 27, the latter of which may likewise be enclosed within a similar conduit.

Referring to FIG. 2, the drive assembly 13 (see FIG. 3) of the shared tendon actuator assembly 40 is positioned within the housing 30, for example an aluminum or molded plastic outer enclosure. Other linear actuator technologies may be employed in lieu of that shown in FIG. 2, such as roller screws or back-driveable lead screws, without departing from the intended inventive scope. A servo motor 36 has an axis 19, and includes electrical wires 48 that are connectable to a power supply (not shown). Axis 19 may be positioned off-axis with respect to a drive axis 11 of the drive assembly 13 shown in FIG. 3 in order to reduce a required packaging length within the sleeve 14 of FIG. 1. A gear set 38 such as a set of spur gears may be used to transfer torque from axis 19 of the servo motor 36 to the drive axis 11, i.e., the primary longitudinal axis of the drive assembly 13 positioned within the housing 30.

The housing 30, which may be configured as a tube as shown, may include a removable end cap 42 and an additional end cap 47 which may or may not be removable. The removable end cap 42 defines a pair of spaced tendon channels 44. The tendon 31, which is folded upon itself as noted above, is routed through the tendon channels 44. The tendon channels 44 may be circular through-openings having a diameter exceeding that of the tendons 31, such that movement of the tendons 31 is not impinged by the end cap 42. Loops 31L at the free ends of the folded tendon 31 are then connected to the fingers 16 of FIG. 1 as described above, for instance via connection to the saddles 33S. In this manner, tension applied to the tendon 31 will pull on the adjacent fingers 16 to which the tendon loops 31L are connected.

Referring to FIG. 3, in a possible configuration, the shared actuator assembly 40 may use a drive assembly 13 in the form of a ball screw assembly. In such an embodiment, a tendon hook 54 is attached to an internally-threaded ball nut 56, with the latter being threaded to an externally-threaded ball screw 52, e.g., a length of threaded rod. The servo motor 36 of FIG. 2 may deliver output torque to an end 55 of the ball screw 52 to thereby rotate the ball screw 52. Rotation of the ball screw 52 in turn causes the tendon hook 54 and ball nut 56 to translate linearly along the drive axis 11, as indicated by double-headed arrow A. A Hall effect or other suitable position sensor (not shown) may be used to sense the position of the drive assembly 13 within the housing 30. The connection of the tendon 31 to the drive assembly 13 is provided via the tendon hook 54, which will now be described with respect to the remaining Figures.

Figure 4:
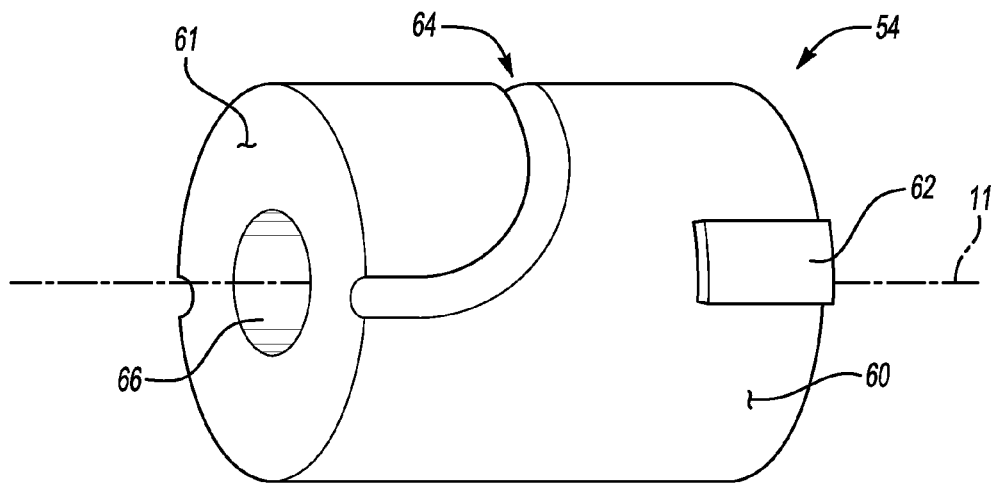
FIG. 4 is a schematic perspective view illustration of an example tendon hook usable as part of the drive assembly of FIG. 2.
Figure 5:
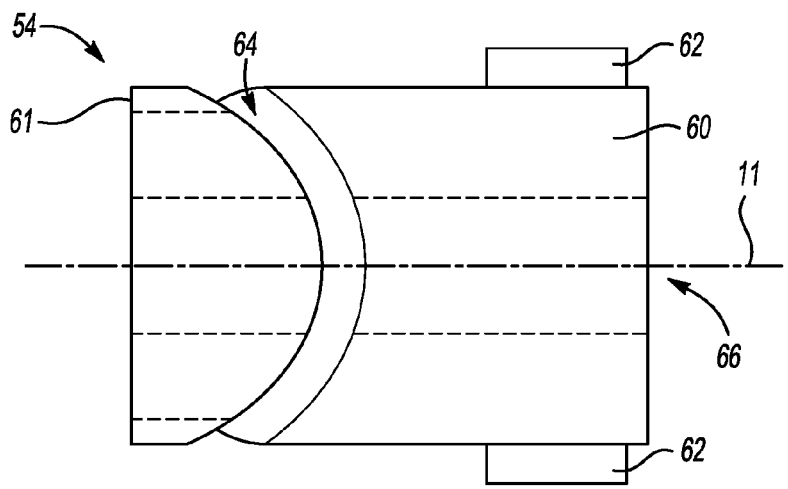
FIG. 5 is a schematic plan view illustration of the tendon hook shown in FIG. 4.

FIGS. 4 and 5 provide different views of the tendon hook 54 of FIG. 3. The tendon hook 54 includes a circumferential surface 60, i.e., its primary or major surface, and an end surface 61. The tendon hook 54 is cylindrical, and thus defines a center bore 66. The center bore 66 allows sufficient clearance for the tendon hook 54 to translate relative to the ball screw 52 without contact. The tendon hook 54 is attached to the internally-threaded ball nut 56 as shown in FIG. 3, such that the two pieces comprise an assembly that move together. Tabs 62 may extend radially outward from the circumferential surface 60 of the tendon hook 54 to engage with a mating slot (not shown) of the housing 30 to ensure proper alignment within the housing 30. The tabs 62 prevent the tendon hook 54 from rotating on its axis 11 when the ball screw 52 is rotated by the servo motor 36, thus converting the rotating motion of the ball screw 52 to linear translation of the ball nut/tendon hook assembly.

An important key to the proper design of the tendon hook 54 is the presence of an arcuate tendon channel 64, i.e., a bow-shaped or semicircular surface slot in the tendon hook 54. The tendon 31 of FIGS. 2 and 3 is routed through the arcuate tendon channel 64 at the approximate midpoint of the tendon 31, such that the tendon 31 is divided into portions or approximate halves by the geometry of the arcuate tendon channel 64. This geometry, as well as the low coefficient of friction materials of the tendon hook 54, ensures that the servo motor 36 of FIG. 2 applies balanced tension to the portions of the tendon 31 when closing or opening the tendon-driven fingers 16 of FIG. 1. A dynamic coefficient of friction of between 0.1 and 0.4 is desirable. An example material capable of this is nylon-filled or PTFE-filled acetyl resin.

The arcuate tendon channel 64 acts as a sliding interface for the tendon 31 of FIGS. 2 and 3 as the tendon 31 moves back and forth within the channel 64 under tension. Therefore, the arcuate tendon channel 64 should have a sufficiently large diameter relative to that of the tendon 31. In an example embodiment, the arcuate tendon channel 64 may be approximately 35-45% wider than the tendon 31 so as not to impinge the sliding motion of the tendon 31 within the arcuate tendon channel 64. In another example embodiment, the tendon 31 has a diameter of $40/1000^{th}$ to $60/1000^{th}$ of an inch, and the arcuate tendon channel 64 has a diameter of $60/1000^{th}$ to $70/1000^{th}$ of an inch.

Figure 6:
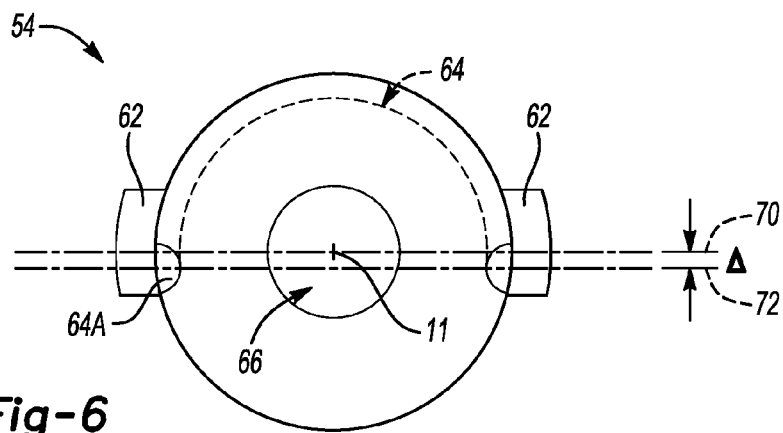
FIG. 6 is another schematic plan view illustration of an end of the example tendon hook shown in FIGS. 4 and 5.

Referring to FIG. 6, in a possible embodiment of the tendon hook 54, a slight offset ($\Delta$) may be provided between an axis 72 bisecting the semi-circular ends 64A of the arcuate tendon channel 64 and an axis 70 bisecting the tendon hook 54. The difference may be only a 1-2 mm in practice, and thus is exaggerated in FIG. 6 for illustrative clarity. The purpose of the offset ($\Delta$) is to ensure that the tendons 31 generally align with the axis 70 when under tension. The purpose of the offset ($\Delta$) is twofold: (1) when the tendon 31 is under tension, the offset ($\Delta$) allows the tensile forces of the tendons 31 to act on the tendon hook 54 on diametrically opposite sides of the axis 70 of the tendon hook 54. This balanced loading is desirable for the efficiency and service life of the ball screw assembly, and (2) by aligning the tendons 31 on the axis 70, the potential for friction of the tendons 31 at the point where the tendons 31 enter the end cap 42 of FIG. 2 is minimized.

The grasp assist device 10 and its various subcomponents described in FIGS. 2-5 provides a design that allows a single tendon 31 to be used for moving adjacent fingers 16 of the glove 12 of FIG. 1. The particular design of the tendon hook 54 as best shown in FIGS. 3-5 ensures that the shared tendon actuator assembly 40 of FIG. 2 applies approximately balanced tension to both portions of the tendon 31, regardless of differing loads encountered by, or travel required by, each portion of the tendon 31. An advantage of the present approach is the possible halving of the number of required linear actuators needed to tension two different tendons 31 in the conventional manner. The size, weight, and control requirements are all reduced for any system using pairs of actuated tendons 31. This in turn may help expand the range of possible uses for the grasp assist device 10 of FIG. 1.

While the best modes for carrying out the invention have been described in detail, those familiar with the art to which this invention relates will recognize various alternative designs and embodiments for practicing the invention within the scope of the appended claims.

The invention claimed is:

1. A grasp assist device comprising:
a glove having a first tendon-driven finger and a second tendon-driven finger;
a flexible tendon having a looped first end and a looped second end connected to the first tendon-driven finger and the second tendon-driven finger, respectively; and
a sleeve having a tendon actuator assembly, including:
a drive assembly having a drive axis; and
a tendon hook defining an arcuate surface slot, wherein the tendon hook is connected to the drive assembly and is linearly translatable along the drive axis via the drive assembly to apply tension to the flexible tendon;
wherein the flexible tendon is folded upon itself and routed through the arcuate surface slot, such that the arcuate surface slot divides the flexible tendon into two portions at a midpoint of the flexible tendon and acts as a sliding interface at the midpoint, with each of the two portions terminating in a respective one of the first and second looped ends, and wherein the actuator assembly tensions the two portions in a balanced manner.

2. The grasp assist device of claim 1, wherein the drive assembly is a ball screw assembly having a ball screw, a ball nut connected to the tendon hook, and a servo motor which produces an output torque to linearly translate the ball nut and the tendon hook along the drive axis.

3. The grasp assist device of claim 1, wherein the tendon assembly includes a removable end cap that defines a pair of circular channels, and wherein the two portions of the tendon are circumscribed by a respective one of the circular channels.

4. The grasp assist device of claim 1, wherein the tendon hook is constructed of material selected from the group consisting of: nylon-filled resin and polytetrafluoroethylene (PTFE) fiber-filled resin, and has a dynamic coefficient of friction of less than about 0.4.

5. The grasp assist device of claim 1, further comprising a gear set which connects the servo motor off-axis with respect to the drive axis.

6. The grasp assist device of claim 1, further comprising a plurality of load sensors connected to the first and second tendon-drive fingers and operable to measure force feedback signals, and a controller in communication with the plurality of load sensors which actuates the drive assembly in response to the force feedback signals.

7. The grasp assist device of claim 1, wherein an offset of between 1 mm and 2 mm is present between an axis bisecting ends of the arcuate surface slot and an axis bisecting the tendon hook.

8. A tendon actuator assembly for a grasp assist device having a first tendon-actuated finger and a second tendon-actuated finger, the tendon actuator assembly comprising:
a drive assembly having a drive axis;
a flexible tendon having a first looped end and a second looped end each connectable to a respective one of the first tendon-actuated finger and the second tendon-actuated finger; and
a tendon hook connected to the drive assembly, wherein the tendon hook is linearly translatable along the drive axis via the drive assembly to apply tension to the flexible tendon sufficient for moving the first tendon-driven finger and the second tendon-driven finger, and defines an arcuate surface slot containing the flexible tendon, wherein the flexible tendon is folded upon itself and routed through the arcuate surface slot such that the arcuate surface slot divides the flexible tendon into two portions at a midpoint of the flexible tendon and acts as a sliding interface at the midpoint, with each of the two portions terminating in a respective one of the first and second looped ends, and wherein the actuator assembly tensions the two portions in a balanced manner.

9. The tendon actuator assembly of claim 8, wherein the drive assembly is a ball screw assembly having a ball screw, a ball nut connected to the tendon hook, and a servo motor which produces an output torque to linearly translate the ball nut and the tendon hook along a length of the ball screw.

10. The tendon actuator assembly of claim 8, further comprising a removable end cap that defines a pair of circular channels, wherein the two portions of the flexible tendon are circumscribed by a respective one of the circular channels.

11. The tendon actuator assembly of claim 8, wherein the tendon hook is constructed of a material selected from the group consisting of: nylon-filled resin and polytetrafluoroethylene (PTFE) fiber-filled resin.

12. The tendon actuator assembly of claim 8, wherein the tendon hook has a dynamic coefficient of friction of less than about 0.4.

13. The tendon actuator assembly of claim 8, further comprising a gear set which connects the servo motor off-axis with respect to the drive axis.

14. The tendon actuator assembly of claim 8, wherein an offset of between about 1 mm and 2 mm is present between an axis bisecting ends of the arcuate tendon channel and an axis bisecting the tendon hook to ensure that the tendons align with the axis bisecting the tendon hook when the tendon is under tension.

15. A grasp assist device comprising:
a glove having a first tendon-driven finger and a second tendon-driven finger;
a flexible tendon having looped first and second ends connected to the first tendon-driven finger and the second tendon-driven finger, respectively, wherein the flexible tendon is a braided polymer;
a plurality of load sensors connected to the first and second tendon-drive fingers and operable to measure force feedback signals; and
a sleeve having a tendon actuator assembly, and including:
a tendon hook having an arcuate surface slot, wherein the flexible tendon is folded upon itself and routed through the arcuate surface slot at a midpoint of the flexible tendon such that the arcuate surface slot divides the flexible tendon into two portions each terminating in a respective one of the first and second looped ends, and acts as a sliding interface for the midpoint of the flexible tendon;
a removable end cap that defines a pair of circular channels, wherein the two portions of the flexible tendon are circumscribed by a respective one of the circular channels;
a drive assembly including a ball screw, a ball nut connected to the tendon hook, and a servo motor which produces an output torque to linearly translate the ball nut and the tendon hook along the drive axis and thereby apply tension to the two portions in a balanced manner;
a controller in communication with the load sensors which actuates the drive assembly in response to the force feedback signal; and
a gear set which connects the servo motor off-axis with respect to the drive axis.

16. The grasp assist device of claim 15, wherein the tendon hook is constructed of material selected from the group consisting of: a nylon-filled resin and a polytetrafluoroethylene (PTFE) fiber-filled resin.

17. The grasp assist device of claim 16, wherein the tendon hook has a dynamic coefficient of friction of less than about 0.4.

18. The grasp assist device of claim 15, wherein an offset of between 1 mm and 2 mm is present between an axis bisecting ends of the arcuate tendon channel and an axis bisecting the tendon hook.

\* \* \* \* \*